United States Patent [19]

Bellavia et al.

[11] Patent Number: 4,827,244

[45] Date of Patent: May 2, 1989

[54] TEST INITIATION APPARATUS WITH CONTINUOUS OR PULSE INPUT

[75] Inventors: Nicholas J. Bellavia, Bartlett; Daniel J. Birk, Aurora; Fred J Conforti, Wheaton; Ronald Sisselman, Aurora, all of Ill.

[73] Assignee: Pittway Corporation, Northbrook, Ill.

[21] Appl. No.: 160,823

[22] Filed: Feb. 26, 1988

Related U.S. Application Data

[63] Continuation-in-part of Ser. No. 140,410, Jan. 4, 1988, abandoned.

[51] Int. Cl.[4] .......... G08B 29/00; G08B 17/10; H04Q 9/14

[52] U.S. Cl. .......... 340/514; 340/515; 340/527; 340/309.15; 340/628; 340/629; 340/630; 340/825.69; 340/825.72

[58] Field of Search .......... 340/514, 515, 539, 531, 340/527, 528, 628–630, 693, 696, 309.15, 63, 64, 65, 825.69, 825.72; 455/603, 600; 307/117; 250/574–578

[56] References Cited

U.S. PATENT DOCUMENTS

| | | | |
|---|---|---|---|
| 1,530,856 | 3/1925 | Schmidt . | |
| 3,294,901 | 12/1966 | Stanghi | 455/603 |
| 3,435,444 | 3/1969 | Kuhn | 340/214 |
| 3,537,089 | 10/1970 | Lee | 340/213.1 |
| 3,594,751 | 7/1971 | Ogden et al. | 340/228 |
| 3,636,514 | 1/1972 | Burgess | 455/603 |
| 3,833,895 | 9/1974 | Fecteau | 340/539 |
| 4,017,193 | 4/1977 | Loiterman | 356/206 |
| 4,053,785 | 10/1977 | Lee et al. | 250/574 |
| 4,099,178 | 7/1978 | Ranney et al. | 340/515 |
| 4,143,368 | 3/1979 | Route et al. | 455/603 |
| 4,166,698 | 9/1979 | Steele | 340/630 |
| 4,181,439 | 1/1980 | Tresch et al. | 356/338 |
| 4,232,307 | 11/1980 | Marsocci | 340/515 |
| 4,232,308 | 11/1980 | Lee et al. | 340/539 |
| 4,258,291 | 3/1981 | Scott et al. | 340/628 |
| 4,266,220 | 5/1981 | Malinowski | 340/630 |
| 4,313,110 | 1/1982 | Subulak et al. | 340/628 |
| 4,321,466 | 3/1982 | Mallory et al. | 250/574 |
| 4,417,235 | 11/1983 | Del Grande | 340/628 |
| 4,422,068 | 12/1983 | Helft et al. | 340/514 |
| 4,456,907 | 6/1984 | Johnson | 340/514 |
| 4,554,533 | 11/1985 | Bosnak | 340/514 |
| 4,603,325 | 7/1986 | Marino et al. | 340/539 |
| 4,693,110 | 9/1987 | Juengel | 73/1 R |

*Primary Examiner*—Donnie L. Crosland
*Attorney, Agent, or Firm*—Dressler, Goldmith, Shore, Sutker & Milnamow, Ltd.

[57] ABSTRACT

A system for testing a remotely located sensing unit includes a photosensor located within the sensing unit. A control beam of incident electromagnetic energy can be provided from a remotely located portable source such as a flashlight. Directing the beam of radiant energy from the flashlight against the sensor in the unit causes the unit to initiate a test sequence. The unit can be equipped with a photo-detector to terminate an alarm generated in response to a sensed condition. The unit can include a sonic detector. Control circuitry in the unit can decode a sensed encoded incident beam to minimize false tests or to provide multiple remotely initiated functions.

51 Claims, 7 Drawing Sheets

FIG. 6
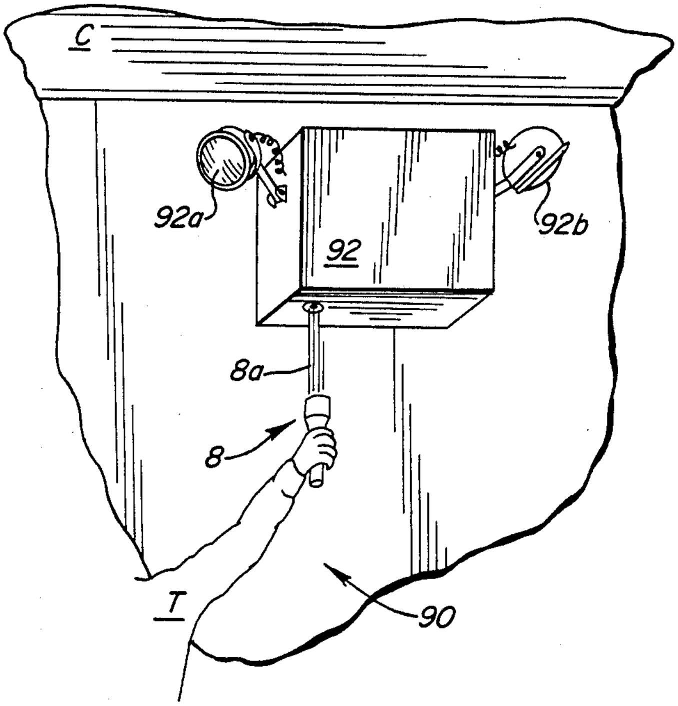
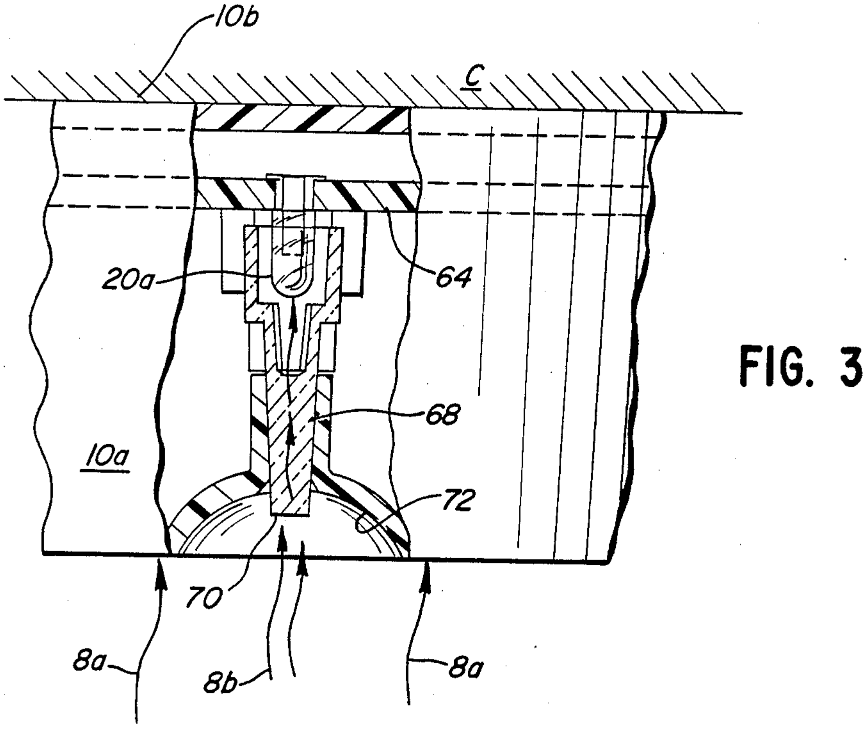
FIG. 3

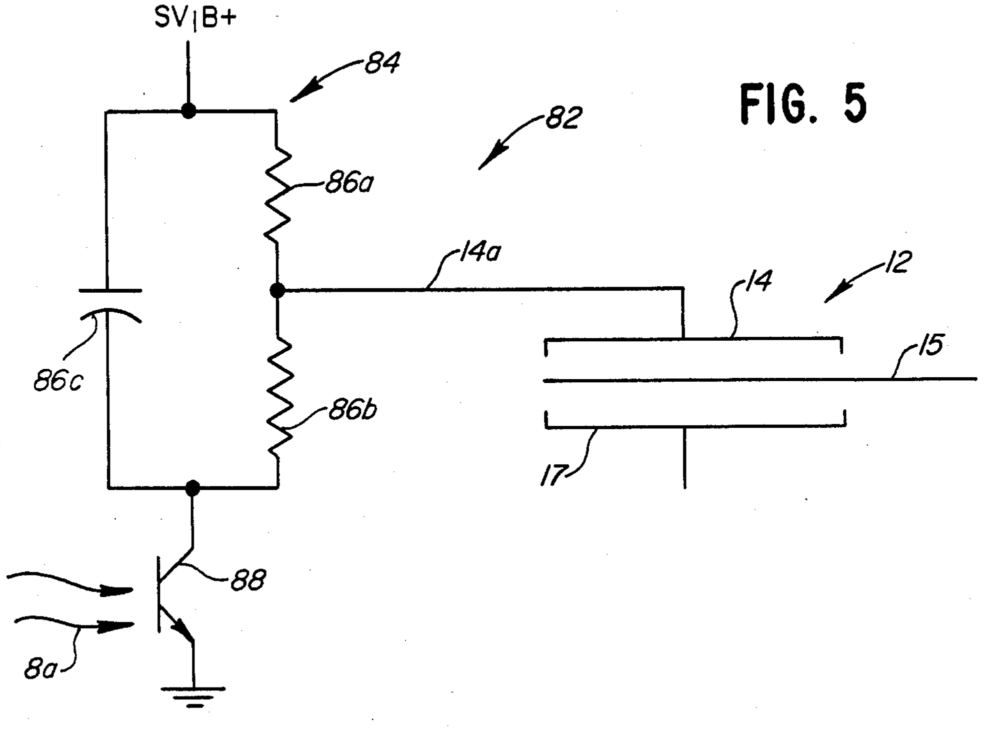
FIG. 5
FIG. 7
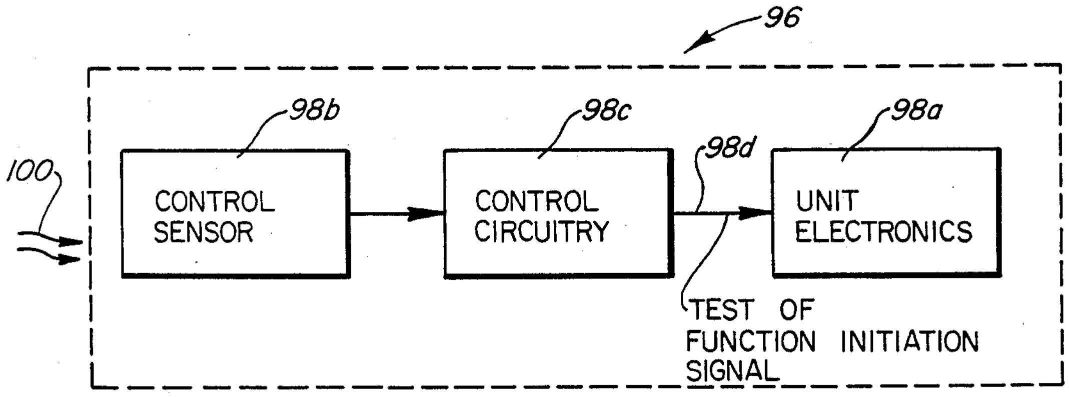

FIG. 8
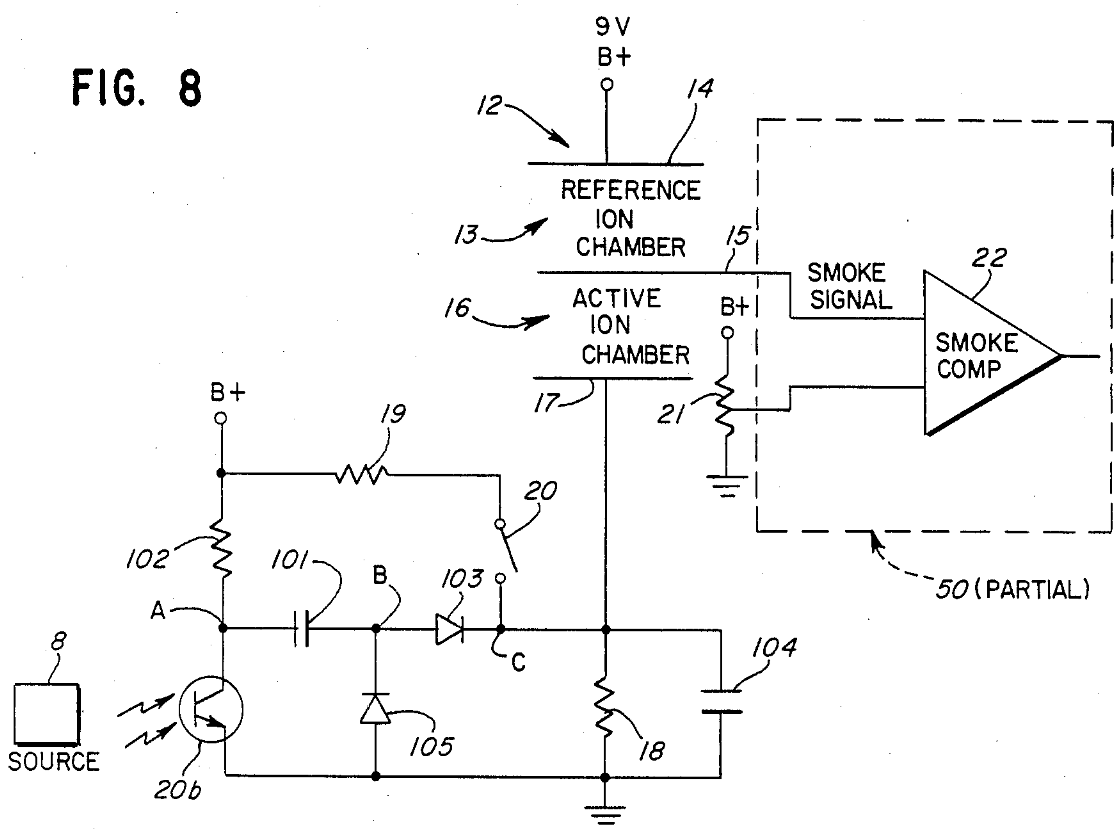
FIG. 9A
FIG. 9B
FIG. 9C
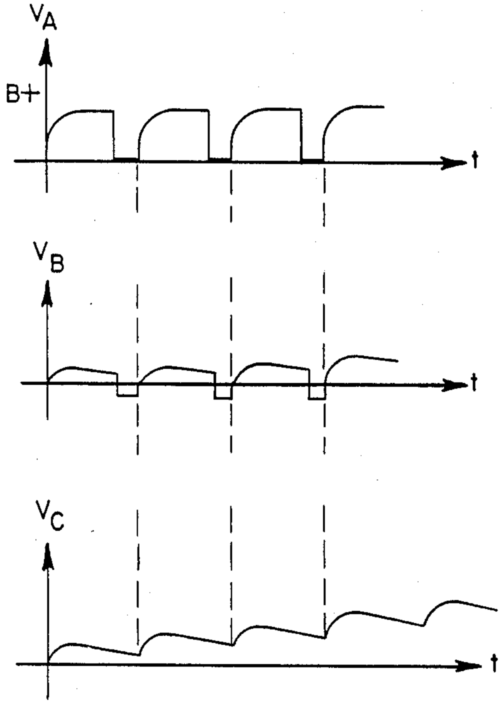

TEST INITIATION APPARATUS WITH CONTINUOUS OR PULSE INPUT

The present patent application is a continuation-in-part of patent application Ser. No. 140,410 filed Jan. 4, 1988 and entitled Test Initiation Apparatus and Method now abandoned.

The invention pertains to the field of testing units which have a primary function. More particularly, the invention pertains to a system and a method for initiating a test sequence within a remotely located unit, such as a smoke detector of power fail sensor unit. The unit might be physically located near the top of a wall or ceiling.

BACKGROUND OF THE INVENTION

A variety of products are available for consumer and industrial use today which can be used to enhance the safety and security of residences and industrial facilities. For example, combustion products or smoke detectors have been recognized as a valuable and important contributor to personal safety both in residences and in commercial establishments.

One such type of smoke detector is disclosed in U.S. Pat. No. 4,595,914 entitled "Self Testing Combustion Products Detector" and assigned to the assignee of the present invention. The disclosure of the '914 patent is hereby incorporated herein by reference.

Such units usually include smoke or flame detection circuitry. The purpose of such circuitry is to provide an early warning in the event that smoke or flame has been detected. The detection circuitry in such units typically is electrically coupled to an alarm unit, such as a horn or a loudspeaker. The horn or loudspeaker functions to generate an audible alarm in the event that the detection circuitry detects the smoke or flame.

Such units may be battery powered. Alternately, they may be hardwired into the building electrical system.

Such units usually include a test function. The purpose of the test function is to provide a means to test the power supply and/or the associated detection circuitry prior to an actual fire having been detected. Such testing is important to verify that in fact the unit is working properly. Such detection circuitry usually includes a manually operable push button switch for the purpose of initiating the unit test function.

Experience has indicated, however, that merely providing such a "push to test" function is no assurance that it will in fact be used. Where the units are mounted at the top of a wall or on a ceiling (the usual location), the test function may never be exercised. This is because it is necessary to physically reach the unit and to press the test initiating push button to cause the test to be made. In order to reach the unit it is often necessary to use a chair or ladder. Where the units are installed in an industrial building it may be very inconvenient, if not impossible, to routinely locate a ladder to test the device.

Smoke detectors are known which incorporate a reed switch to initiate a test of the unit. A magnet on a pole can be used to close the reed switch and initiate the test.

Known units which incorporate reed switches have a disadvantage in that once the adjacent magnet has closed the switch, it will remain closed even after the magnet has been removed. The unit will as a result remain in the test mode. To terminate the test it is necessary to remove power from the unit.

Beyond the above-noted problem of testing smoke detectors, other types of units pose similar problems. For example, many buildings today are equipped with battery operated emergency lighting systems. Such lighting systems can be installed in the form of a plurality of separate units each including a battery, a battery operated light and a sensor unit. The sensor unit continually tests the AC power available adjacent the emergency light. On detecting a failure of AC power, the battery is switched to the emergency lights to provide illumination.

Such emergency light modules often include a "push-to-test" type function. This test function exercises the battery by coupling it to the emergency light to verify that the battery has been properly charged and can in fact illuminate the emergency lights.

As in the case of smoke detectors, such emergency light modules are usually mounted at the top of walls, adjacent a ceiling or on a ceiling itself. Hence, they are inconveniently located and often are not tested on a regular basis.

In view of the fact that such units may be depended on by a large number of people to provide an alarm or illumination for safe evacuation of a structure, the ability to quickly and easily test them is important to safety of the occupants of the facility.

Hence, there is a need for a system and apparatus for initiating a test function or functions associated with a remotely located unit. Preferably initiation of the test function can take place without the need of any person climbing on a chair or ladder and without the need of any other special equipment.

SUMMARY OF THE INVENTION

In accordance with the invention a system and a method are provided for initiating a test of a remotely located unit. The system includes a remotely located unit which has a primary, or selected, function and at least one secondary function.

For example, the unit could be a ceiling mounted smoke or flame detector. Alternately, the unit could be a remotely located command or monitor module or an emergency light module.

If the unit is a smoke or flame detector, it would have as a primary function detection of smoke or flame. If the unit is a command or monitor module it would have as a primary function the control or monitoring of other units or conditions.

If the unit is an emergency light, it would have as a primary function the illumination of an area in response to a detected power failure.

The unit would have a test mode as a secondary function. The purpose of the test mode is to initiate an internal test sequence for the unit. This test sequence, when properly executed, provides verification that the unit is capable of properly carrying out its primary function.

The test mode could be manually initiated. However, where the unit is remotely located, as on a ceiling or high wall, manual initiation is inconvenient or impossible. In accordance with the invention, the test mode can be remotely initiated.

The unit includes a sensor. The sensor could be an electro-magnetic energy detector. Upon detecting a predetermined incident radiant energy signal the secondary, test, function can be initiated.

The radiant energy signal can be generated by a remote source. Use of a remote source overcomes the inconvenience of attempting to initiate a test or other secondary function when the unit is remotely located on a ceiling or high wall.

In certain embodiments of the invention, the predetermined incident radiant energy signal is received at the unit as a constant illumination at or above a predetermined illumination intensity level. The radiant energy may guided in a collector to reduce the possibility of inadvertent initiation of the secondary test function by ambient illumination.

In still other embodiments of the invention, the predetermined incident radiant energy signal must be intermittent, or pulsed, in order to initiate the secondary, test, function. The signal must be pulsed within a range of duty cycles and frequencies that are typical of manual on-sensor/off-sensor illumination with a switched light source or with a cyclically swept radiant energy beam. For example, such a pulsed or swept beam may be produced with a flashlight. In still another embodiment of the invention, the secondary test function is initiable by a constant illumination of one detector only if, and while, another, spaced-apart detector is subject only relatively low, ambient, illumination levels.

The unit can be a smoke detector with a test mode to verify the operation thereof. The detector, in this embodiment, includes an optical sensor, such as a phototransistor, coupled to the internal test circuitry of the unit. A selected beam of radiant energy, such as a beam of light, from a source can be directed at the sensor. Upon sensing the incident beam of light, the optical sensor will respond by switching from a first state to a second state. The test circuitry in the unit, in response to detecting the second state, will then initiate the test function.

Instead of an optical detector and an incident light beam, a radio frequency detector could be used in combination with a beam of radio frequency energy. As yet another alternate, a sonic detector could be used in combination with a beam of sonic energy.

In yet another embodiment of the invention, a third function could be initiated. The unit could distinguish between a command initiating the test function and the third function through the use of two spaced-apart detectors or one detector in combination with a coded input command signal.

Where the unit is a smoke detector, the secondary function could be a remotely actuated test function with the third function an alarm silence function. Such a unit could be used to advantage in an intermittently smoky area such as in a kitchen. An ordinary flashlight could be used to initiate the silence function in the event that the unit sounds an alarm in response to detecting cooking smoke not due to a fire.

The test function for the unit could be initiated by directing the same beam of light at another part of the unit, by using an optical filter or by pulsing the beam of light in a coded sequence.

The present invention has applicability in connection with a variety of systems with remotely located sensors. For example, burglar alarms often include magnetic sensors which detect movement of one member, such as a door or window, with respect to another, such as a frame.

In accordance with the present invention, such sensors could be provided with a photosensor. The photosensor could generate a signal corresponding to detected relative movement in response to receipt of an incident radiant energy beam. This signal could be used not only to test the functioning of the sensor but also to test the related wiring.

Numerous other advantages and features of the present invention will become readily apparent from the following detailed description of the invention and the embodiments thereof, from the claims and from the accompanying drawings in which the details of the invention are fully and completely disclosed as a part of this specification.

FIG. 3 is an enlarged, fragmentary, side plan view, partly broken away, of a detector which incorporates the circuitry of FIG. 2;

FIG. 5 is a partial electrical schematic of an electrical unit having remotely controllable function terminating circuitry;

FIG. 6 is an overall view of an alternate test initiating system;

FIG. 7 is an overall block diagram of a generalized system in accordance with the present invention;

Figure 2:
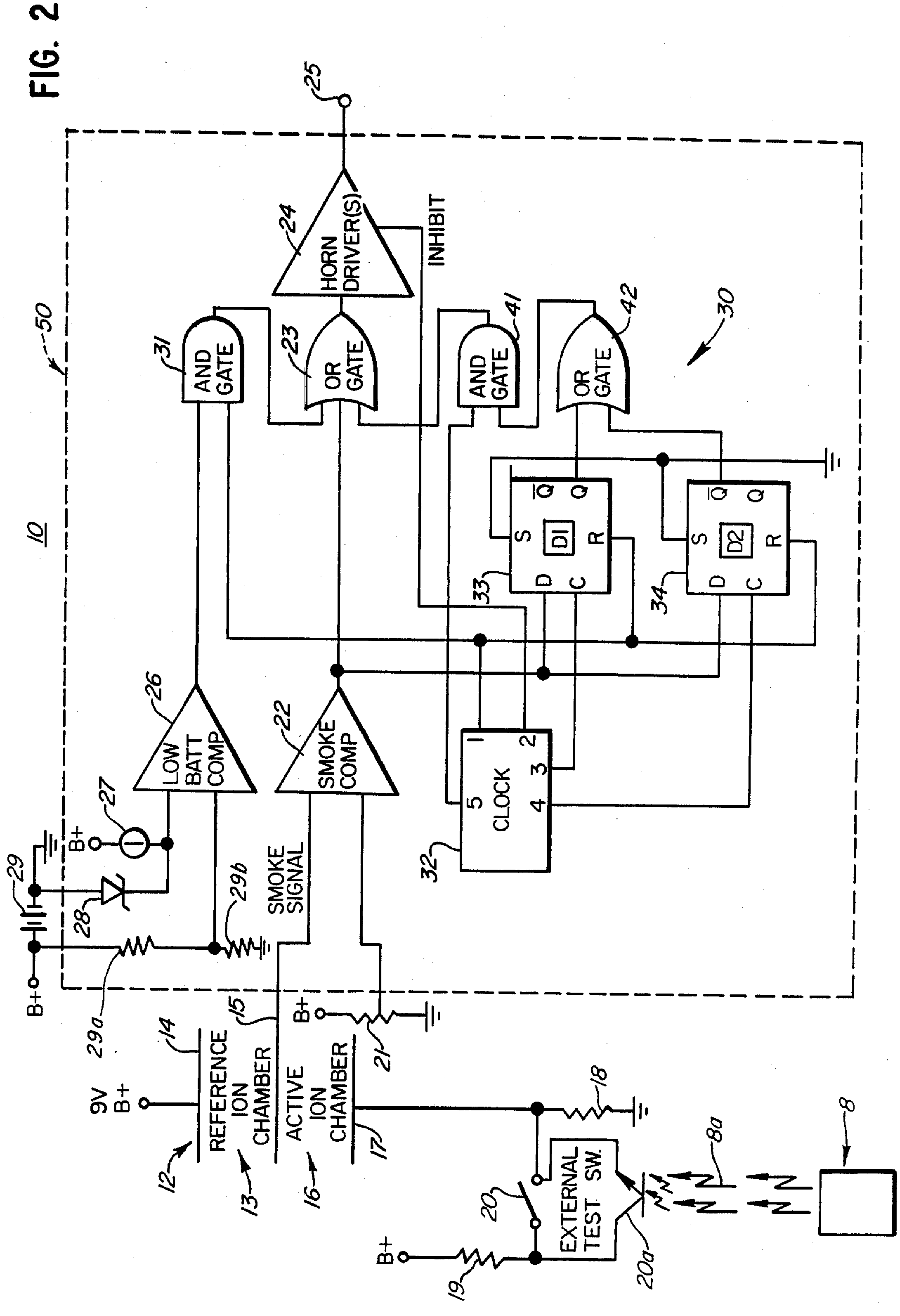
FIG. 2 is a schematic diagram of a sensor useable in the system of FIG. 1, having a first embodiment of remotely controllable function initiating circuitry.
Figure 10:
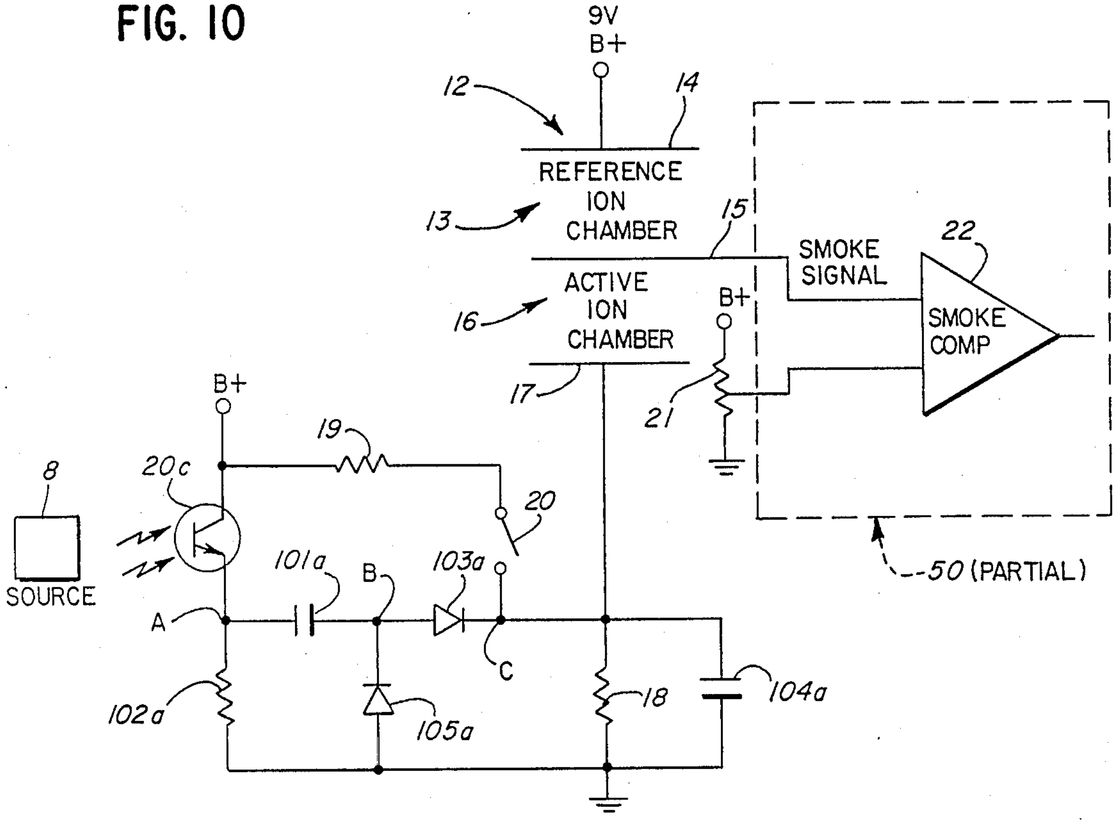
Figure 12:
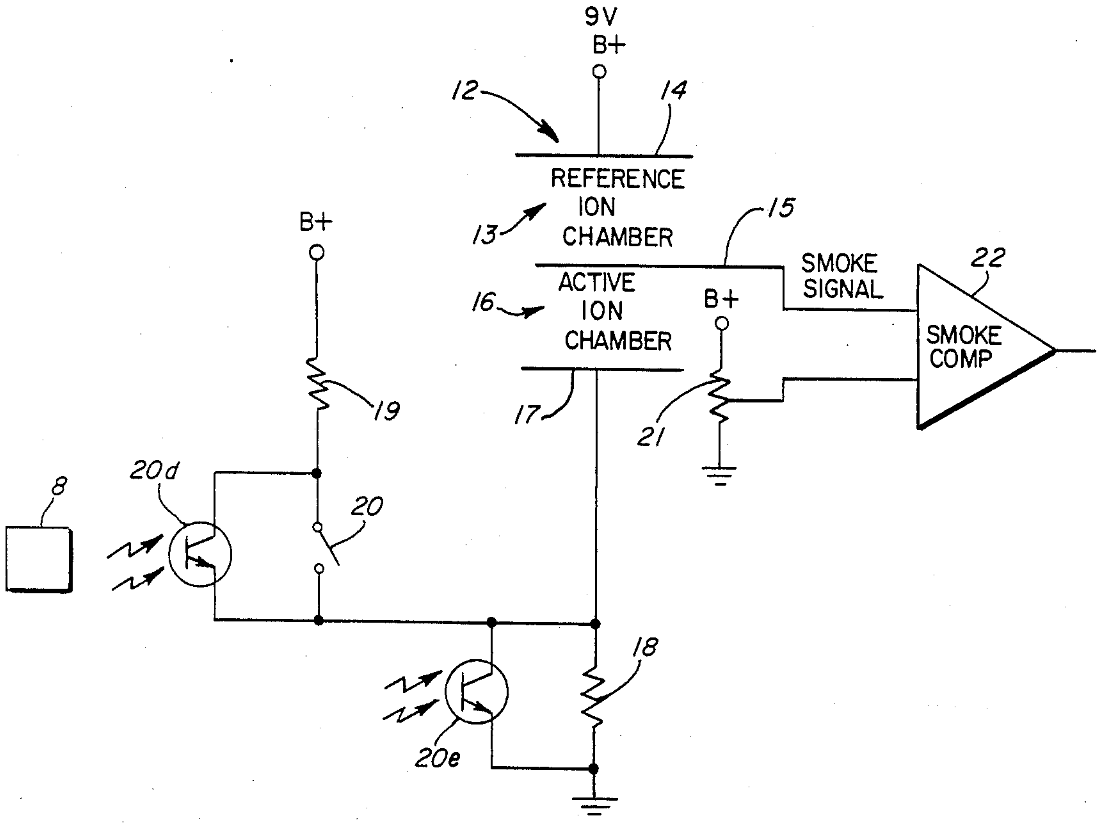

FIG, 8 is a partial electrical schematic of a second embodiment of the remotely controllable function initiating circuitry concerning which a first embodiment was shown in FIG. 2;

FIGS. **9*a* through 9*c*, are diagrams of waveforms occurring at selected junctions in the circuitry of FIG. 8** upon its actuation;

FIG. 10 is a partial electrical schematic of a third embodiment of the remotely controllable function initiating circuitry concerning which a first embodiment was shown in FIG. 2;

FIGS. **11*a* through 11*c*, are diagrams of waveforms occurring at selected junctions in the circuitry of FIG. 10 upon its actuation; and FIG. 12 is a partial electrical schematic of a fourth embodiment of the remotely controllable function initiating circuitry concerning which a first embodiment was shown in FIG. 2**.

DETAILED DESCRIPTION OF THE PREFERRED EMBODIMENT

While this invention is susceptible of embodiment in many different forms, there is shown in the drawing and will be described herein in detail specific embodiments thereof with the understanding that the present disclosure is to be considered as an exemplification of the principles of the invention and is not intended to limit the invention to the specific embodiments illustrated.

Figure 1:
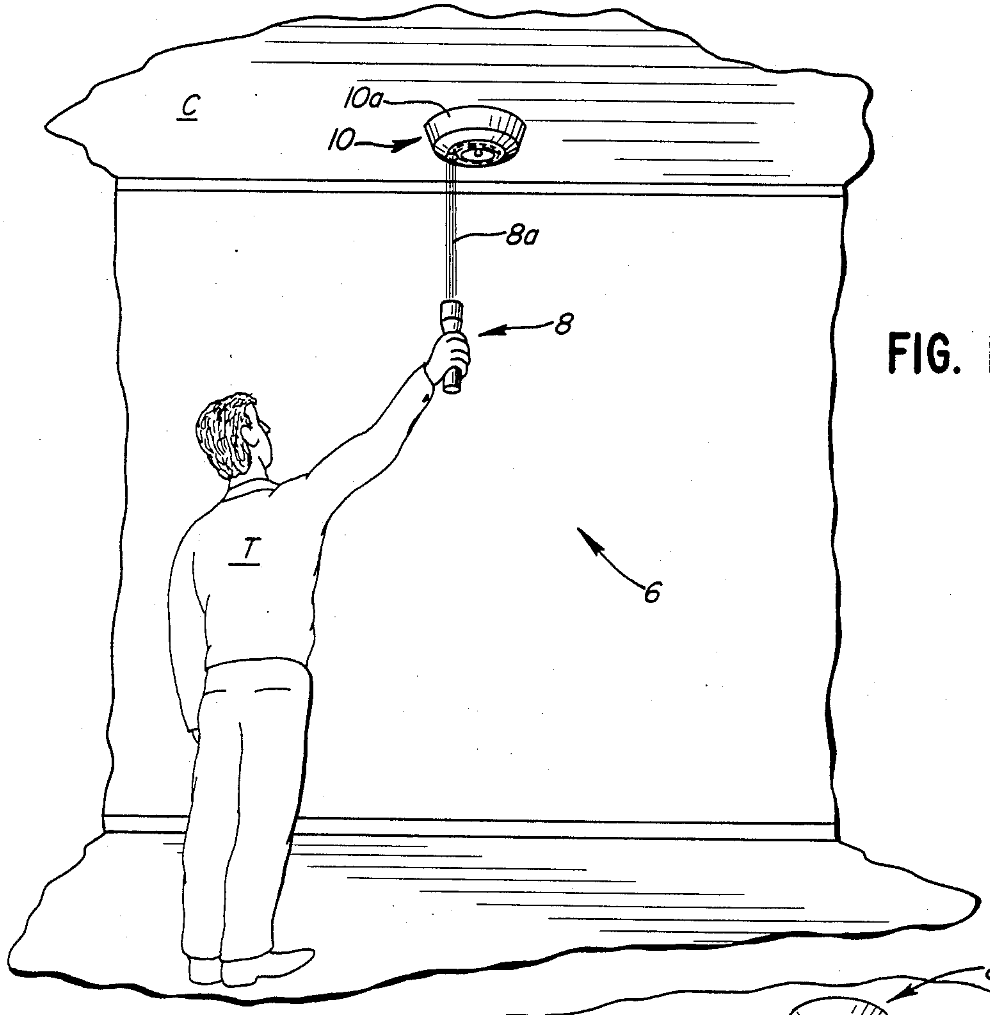
FIG. 1 is an overall view of a test initiating system in accordance with the present invention.

With respect to FIG. 1, a system 6 is illustrated for the purpose of remotely initiating a test of a selected apparatus. The system 6 includes a source of radiant energy 8. In the exemplary embodiment, the source of radiant energy 8 can be an ordinary flashlight.

A beam of light **8*a* from the source 8 is directed by a Testor T toward a remotely located apparatus 10. In the exemplary embodiment of FIG. 1, the remotely located apparatus 10 is a combustion products or smoke detector With respect to FIG. 2, the detector 10 includes circuitry, which is connected to a sensor 12 of the ionization type. The sensor 12 includes a reference ionization chamber 13 having an electrode 14. The electrode 14 is connected to a positive terminal of a voltage source such as a battery 29. An electrode 15 is maintained in a spaced relationship to the electrode 14 by a spacer (not shown) of insulating material. The electrodes 14 and 15** and the spacer together form a relatively imperforate closure.

The sensor 12 also includes an active ionization chamber 16 which has an electrode 17. The electrode 17 may be in the form of a relatively perforate conductive housing cooperating with the electrode 15 to define the active ionization chamber 16. The electrode 15 is common to both chambers 13 and 16.

Means are provided, such as a radioactive source (not shown) for ionizing air molecules within both of the chambers, whereby with a voltage applied across the electrodes 14 and 17 an electric field is generated within each chamber to establish a current flow therethrough by movement of the ions between the electrodes in a well known manner. The reference and active chambers 13 and 16 thus form a voltage divider and they are connected in series with a resistor 18 between the B+ supply 29 and ground.

Thus, the voltage at the electrode 15 is a function of the relative impedances of the chambers 13 and 16. Resistor 18 is much lower in impedance than the ionization chambers 13 and 16 and will therefore normally not influence the sensing electrode voltage.

Connected in parallel with the sensor 12 is the series combination of a resistor 19 and a manually-operated, normally-open test switch 20 for manually testing to see that the sensitivity of the sensor 12 is above a predetermined minimum sensitivity in a well known manner, as is described in greater detail in U.S. Pat. No. 4,097,850 also incorporated herein by reference.

The combustion products detector 10 also includes a potentiometer or voltage divider 21 connected across the B+ supply and having a wiper which is connected to the reference terminal of a smoke comparator 22. The other terminal of the comparator 22 being connected to the sensor electrode 15.

The output of the comparator 22 is connected to one of three inputs of an OR gate 23. The output of the OR gate 23 is connected to the input of a horn driver 24. The output of the horn driver 24 is connected to an output terminal 25 to which may be connected a suitable horn (not shown).

The horn driver 24 may be a single driver usable to activate an associated electromechanical horn or multiple drivers usable to operate a piezoelectric horn. It will be appreciate that other types of annunciators could also be provided.

The combustion products detector 10 also includes a low battery comparator 26 having a reference input terminal which is connected to an internal reference voltage provided by a current source 27 connected to the B+ supply 29. The reference voltage is regulated by a Zener diode 28. The anode of the Zener diode 28 is connected to the negative terminal of a battery 29. The positive terminal of the battery 29 is the B+ supply The positive terminal of the battery 29 is connected via a resistor divider network **29*a* and 29*b* to the other input terminal of the comparator 26**.

The output of the low battery comparator 26 is connected to one of two inputs of an AND gate 31, the output of which is connected to one of the inputs of the OR gate 23. The other input of the AND gate 31 is connected to the output line 1 of a clock 32. That output line is also connected to the reset terminals of two D-type flip-flops 33 and 34. The set terminals of those flip-flops are connected to ground. The data inputs of the flip-flops 33 and 34 are connected to the output of the smoke comparator 22, while the clock inputs of the flip-flops 33 and 34 are respectively connected to output lines 3 and 4 of the clock 32.

The clock 32 also has an output line 2 which is connected to an inhibit terminal of the horn driver 24.

The clock 32 also has an output line 5 which is connected to one input of an AND gate 41. The other input of gate 41 is connected to the output of an OR gate 42 having two input terminals which are respectively connected to the Q output of the flip-flop 33 and the inverted Q output of the flip-flop 34. The output terminal of the AND gate 41 is connected to the other input terminal of the OR gate 23. If desired the above noted circuitry could be replaced by a single integrated circuit 50 such as type MC14467 indicated in dashed lines in FIG. 2.

In normal operation, in the presence of combustion products the impedance of the active ionization chamber 16 will increase. When the voltage at the electrode 15 reaches the reset level at the external reference, as determined by the potentiometer 21, an output will be produced from the smoke comparator 22, which is transmitted through the OR gate 23 to activate the horn driver 24. The associated horn (not shown) will remain activated as long as the amount of combustion products is sufficient to maintain the voltage of the electrode 15 at or above the external reference.

If it is desired to manually test the operation of the combustion products detector 10, the external test switch 20 is closed, thereby connecting the voltage divider consisting of resistors 19 and 18 in parallel with the sensor 12. This operates to raise the voltage at the electrode 15 in the same manner as it would be raised by the presence of actual combustion products in an amount sufficient to actuate the alarm. Accordingly, the closure of the test switch 20 acts to simulate the presence of combustion products, raising the voltage of the electrode 15 above the external reference to produce an output from the smoke comparator 22.

The detector 10 also includes an infrared-sensitive phototransistor **20*a*. The phototransistor 20*a* could be a type TIL 414. That phototransistor is sensitive to infrared generated by the flashlight 8. In response to having detected an incident beam of radiant energy 8*a* which includes frequencies in the infrared range, the transistor 20*a*** will switch from a normally open or non-conducting state to a closed or conducting state.

When the transistor **20*a* conducts, the detector 10 responds as if the normally open push button switch 20 has been manually closed. Hence, the unit 10** responds to simulate the presence of combustion products as described above.

Removing the beam **8*a* of infrared-bearing radiant energy from the input of the transistor 20*a* results in the transistor 20*a* turning off and becoming open-circuited. This is equivalent to releasing the switch 20. The unit 10 then exits its test mode. It is an important aspect of the present invention that when the beam 8*a* of incident radiant energy ceases impinging on the switch 20*a* that the unit 10** automatically exits the test mode. This feature makes it possible to easily use the present apparatus and method in a system which incorporates a plurality of interconnected remotely located units.

FIG. 3 illustrates the mechanical structure of the unit 10 as it pertains to the present invention. The unit 10 includes a base 10b and a cover or housing 10a partly broken away. A printed circuit board 64 is carried by the base 10b. The printed circuit board 64 carries the circuitry of FIG. 2. The base 10b would be affixed to the ceiling, such as the ceiling C in FIG. 1.

The unit 10 also includes a plastic light collector 68. The collector 68 directs a portion 8b of the beam of incident energy 8a on to the phototransistor 20a. The collector 68 can be a piece of transparent plastic. To enhance the sensitivity of the unit 10 only to incident light which is intended to cause the unit to enter its test sequence, a surface 70 can be roughened to reduce the transmission of incident energy therethrough. This reduces the possibility of the unit 10 entering its test mode due to random beams of incident energy not purposefully directed against the end surface 70 of the light pipe or light collector 68.

The end 70 can also be recessed in a depression 72 to further limit the impingement of incident light thereon. In addition, the collector 68 can be molded of a selected plastic which can function as a filter to attenuate all but a selected control frequency such as incident infrared.

Figure 4:
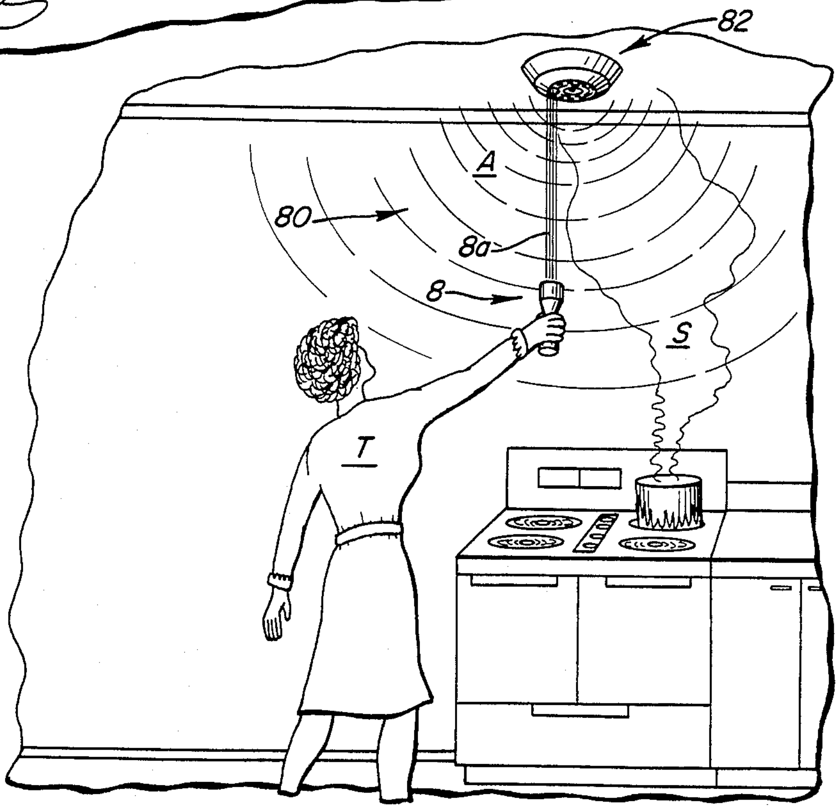
FIG. 4 is an overall view of a function terminating system in accordance with the present invention.

FIG. 4 illustrates another embodiment of the present invention. In the embodiment of FIG. 4, a system 80 is illustrated which can be used to regulate or terminate an unnecessary alarm condition. For example, as illustrated in FIG. 4, smoke S which is present due to cooking has been sensed by a detector 82. The detector 82 is emitting an audible signal indicated by sound waves A. An individual T, present in the immediate area, can utilize the system 80 which includes the flashlight 8 and the detector 82, for the purpose of temporarily terminating the audible indication A corresponding to the detected smoke.

Hence, the- system 80 enables the remotely located individual T to terminate an alarm condition from a sensor, such as the sensor 82. To carry out the alarm terminating function, the detector 82 senses a portion of the incident beam 8a of radiant energy.

FIG. 5 is a schematic diagram of a portion of the combustible products detector 82. The detector 82 can be electrically identical to the detector 10 of FIG. 2 with the addition of the circuitry of FIG. 5. FIG. 5 includes alarm terminating circuitry 84. The alarm terminating circuitry 84 includes first and second resistors 86a and 86b as well as timing capacitor 86c. The series combination of the resistors 86a and *b*, which are coupled in parallel with the capacitor 86c, is in turn coupled to a phototransistor 88. The phototransistor 88 can be the same type as the phototransistor 20a previously discussed.

The ionization sensor 12 will apply a voltage on the order of 5 volts or more to the line 15 in response to detected combustion products when that sensor is energized, as in FIG. 2, with a 9-volt source 29. In the detector 82, as illustrated in FIG. 5, the sensor 12 is energized off of the battery 29 through the resistor 86a.

If the transistor 88 is in a non-conducting state, the full 9 volts from the battery 29 will appear on a line 14a. This voltage is then coupled to and will energize the sensor 12.

If the phototransistor 88 is switched to its conducting state, in response to a received beam of incident infrared energy 8a, the voltage on line 14a will immediately drop to about 7 volts. With a 7-volt potential applied to the line 14a, the output from the sensor 12 on the line 15 will also drop, thereby terminating the alarm condition.

Further, when the transistor 88 conducts the capacitor 86c will almost immediately become charged with about 9 volts thereacross. When the beam 8a is terminated, the phototransistor 88 will again switch to its non-conducting state.

When the phototransistor 88 resumes its non-conducting state, the capacitor 86c begins discharging through the resistors 86a and 86b with a corresponding time constant. Hence, the voltage on the line 14a begins to increase exponentially from 7 volts or so toward 9 volts, the B+ value.

During the time interval when the voltage on the line 14a is increasing, the output of the sensor 12 on the line 15 continues to be at a value low enough that the audible alarm is not sounded. The silenced or alarm-terminated condition will continue until the voltage on the line 14a approaches the 9-volt B+ value. If in the interim the smoke S has been disseminated, such as by drawing it out with a fan, the sensor 12 will not reinitiate the alarm condition.

Hence, the alarm termination or silencing circuitry 84 is effective, in response to a beam of incident energy 8a to reduce the sensitivity of the sensor 12 by reducing the voltage applied thereto. That reduced sensitivity terminates the alarm condition. It also makes reinitiation of the alarm condition more difficult than normal until the capacitor 86c discharges.

In the exemplary embodiment of FIG. 5, resistors 86a and 86b can have values on the order of 330K ohms and 1 Meg. ohms respectively. Capacitor 86c can have a value on the order of 100 microfarads.

FIG. 6 illustrates an alternate system 90. In the system 90 the flashlight 8 is used for remotely initiating a test function of a battery-powered emergency light module 92 mounted adjacent the ceiling C. Modules such as the module 92 continuously sense applied electrical power. In the absence of electrical power, the battery powered emergency lights 92a and 92b immediately turn on to provide illumination.

Battery-powered emergency light modules, such as the module 92 often include a manually operable test function for the purpose of testing the charge of the storage battery along with the operation of the associated emergency lights A photo sensor such as the phototransistor 20a can be incorporated into the battery-powered emergency light module 92 to initiate the test function at a distance in response to the presence of an incident beam of radiant energy 8a.

It will be understood that while embodiments of the present invention have been illustrated in combination with a portable electric unit, such as a flashlight which generates a beam of radiant energy, that the invention is not limited to such an implementation. A block diagram is illustrated in FIG. 7 of a generalized unit 96.

The unit 96 includes circuitry 98a for the purpose of carrying out a predetermined function For example, and without limitation, the exemplary functions could include detection of flame, combustible products, or failure of applied power.

The unit 96 also includes a control sensor 98b. The control sensor can detect an incoming control beam 100 from a remote source The control beam or signal 100 can be a beam of sonic energy, or a beam of electromagnetic energy of a selected frequency such as infrared or radio frequency energy.

Coupled between the control sensor 98b and the unit electronics 98a is selected control circuitry 98c. The circuitry 98c can decode the electrical signals generated by the control sensor **98*b* in response to the incoming control beam 100. For example, the beam 100 can be a continuous beam or it can be a beam having a plurality of spaced-apart pulses of a selected type The beam 100** could be selectively modulated.

The control circuitry **98*c* can respond to the signals generated by the control sensor 98*b* for the purpose of decoding the incoming beam 100. The control circuitry 98*c* in turn can generate an appropriate test or function initiating signal on a line 98*d* for the purpose of causing the unit electronics 98*a*** to execute a predetermined test or carry out a predetermined function.

Further embodiments of remotely controllable function-initiating circuitry in accordance with the present invention are shown in partial schematic view in FIGS. 8, 10, and 12. These circuits are particularly directed to preventing false initiation of the secondary, or test, function under high ambient illumination intensity levels. Specifically, the circuits are substantially immune to false initiation when tested under Underwriters' Laboratory standard 217, paragraphs 41.1(h),(i) and 41.2. This standard calls for ten seconds of smoke detector illumination by a 150-watt incandescent bulb situated at a distance of one foot, followed by five seconds of darkness.

A second embodiment of the remotely controllable functional initiation circuitry, a first embodiment of which is shown in FIG. 2, is shown in partial electrical schematic diagram in FIG. 8. This circuit, as does the further embodiment circuit shown in FIG. 10, responds to pulses of light. Any incidence of sufficiently intense light on phototransistor **20*b* arising from light source 8 causes it to conduct. Upon such conduction, the collector voltage of phototransistor 20 *b* drops, and the charge on capacitor 101 discharges to ground. Oppositely, when the illumination from light source 8 is removed, the phototransistor 20 *b* shuts off and its collector voltage rises. Current then flows from positive voltage source B+ through resistor 102, capacitor 101, diode 103, and, in parallel, resistor 18 and capacitor 104. The result of this current flow is that a small amount of charge is transferred to capacitor 104**.

If the sequence of enabling, and disabling, conduction of phototransistor **20*b* is repeated quickly enough, and at an appropriate duty cycle, then the ultimate accumulation of charge, and voltage, on capacitor 104 will rise sufficiently high so as to raise the voltage at electrodes 17 and 15 in the same manner as it would otherwise be raised by the presence of actual combustion products and in an amount sufficient to actuate the alarm. The voltage on capacitor 104 and electrodes 17 and 15 will not continue to rise during a prolonged period when phototransistor 20*b* is shut off because the direct current path from positive voltage source B+ to capacitor 104 and electrode 15 is blocked by capacitor 101**.

This pulsed method activating the function initiating circuitry is alternative to the closure of test switch 20. Such a closure at switch 20 continues to allow current to flow from positive voltage supply B+ through resistor 19 in order to raise the voltage of electrodes 17 and 15.

The operation of the remotely controllable function initiating circuitry shown in FIG. 8 to intermittent, pulsed, exposure to illumination or light may be further understood by reference to FIGS. **9*a* through 9*c*. The voltage waveforms $V_A$, $V_B$, and $V_C$, occurring at junctions A, B, and C within the circuit of FIG. 8 are respectively plotted in FIGS. 9*a*, 9*b*, and 9*c***.

The alternate conduction and nonconduction of phototransistor **20 *b* results in a voltage waveform $V_A$ that essentially varies between voltages B+ and 0. Responsive to the alternating conduction and nonconduction of phototransistor 20*b*, an alternating positive and negative voltage is developed as the waveform $V_B$ shown in FIG. 9*b*. The negative excursion of the waveform is clamped to one dione drop (on the order of 0.7 volt) below ground by action of diode 105**.

Rectification of this alternating voltage waveform $V_B$ by diode 103 produces waveform $V_C$, illustrated in FIG. **9*c*, at capacitor 104. The voltage may be observed to be increasing with each successive on-off actuation of phototransistor 20*b*, ultimately climbing to a threshold level sufficient to cause the actuation of sensor 50 (shown in FIG. 2 and partially shown in FIG. 8**).

In the second variant embodiment circuit in accordance with the present invention shown in FIG. 8, the typical resistance values of resistors 102, 19, and 18 are respectively 100 kilohms, 8.2 megohms, and 3.9 megohms. Both capacitors 101 and 104 are typically of 0.1 microfarads capacitance. Each of the diodes 103 and 105 is typically type 1N 4148. Phototransistor **20*b*** is typically type TIL414.

With these typical component values the intermittent, pulsed, actuation of light source 8 may typically be at approximately one second duration and 50 percent duty cycle so as to cause actuation of the sensor 50. This frequency and duty cycle is readily obtained by manual flicking of the on-off switch on a light source such as a room light or flashlight, or by intermittent scanning of the phototransistor **20*b*** with the beam of a directed light source or flashlight.

A third variant embodiment of the remotely controllable function initiating circuitry in accordance with the present invention is shown in partial schematic diagram in FIG. 10. This circuit is essentially the inverse of the second variant embodiment shown in FIG. 8. Whenever light of sufficient intensity from light source 8 impinges upon phototransistor **20*c* it begins to conduct current, causing the voltage across resistor 102*a*** to rise to nearly the positive supply voltage B+.

Figure 11A:
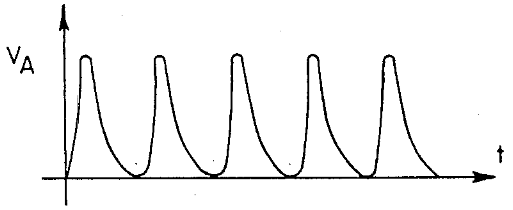

Conversely, whenever phototransistor **20*c* is not conducting, due to lack of sufficiently intense incident light, then the voltage across resistor 102*a* drops to essentially zero. If the incident light that impinges upon phototransistor 20*c* is cycled on and off repeatedly, then the voltage waveform $V_A$ will be substantially as is shown in FIG. 11*a*. Each time that the voltage occurring across resistor 102*a* goes from zero volts to B+ volts, current will flow through capacitor 101*a*, diode 103*a*, and, in parallel, resistor 18 and capacitor 104*a*. Each time that the voltage occurring across resistor 102*a* returns to zero, the capacitor 104*a* will discharge through resistor 18**.

As long as more charge accumulates on the capacitor **104*a* during the charging cycle than is discharged from the capacitor 104*a* during the discharge cycle, the charge, and voltage, upon this capacitor 104*a* will increase. Suitable periodic enablement and disablement of phototransistor 20*c* will ultimately cause a sufficient charge, and voltage, to develop upon capacitor 104*a* so as to raise the voltage upon electrodes 17 and 15 and cause the smoke detector 50** to alarm.

Figure 11B:
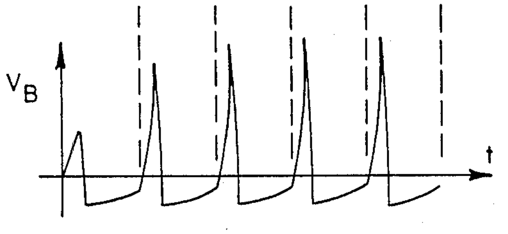
Figure 11C:
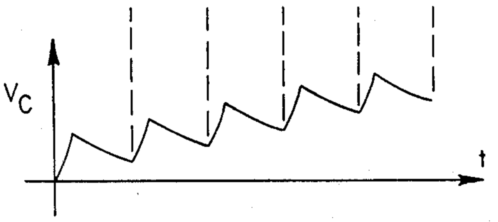

The voltage waveform $V_B$ occurring at the anode of diode **103*a*, and voltage waveform V across the capacitor 104*a*, are respectively shown in FIGS. 11*b* and 11*c***. As with the second embodiment circuit shown in FIG.

8, the third embodiment circuit shown in FIG. 10 still permits of the alternative test enablement of the smoke detector 50 via a current path enabled through resistor 19 by closing of test switch 20.

Within the third embodiment of the remotely controllable function initiating circuitry in accordance with the present invention shown in FIG. 10, the phototransistor 20c is again preferably type TIL414 while the diodes 103a and 105a are again types 1N 4148. The resistors 102a, 19, and 18 are typically respectively values of 2.2 megohms, 8.2 megohms, and 3.9 megohms. The capacitors 101a and 104a typically have values of 0.022 microfarads and 0.1 microfarads respectively. In consideration of these typical values, the third embodiment of the function initiating circuitry shown in FIG. 10 is preferred over the second embodiment of the function initiating circuitry shown in FIG. 8 because it conserves current or the charge in the battery 29. Mainly, it may be recalled that the value of resistor 102 shown in FIG. 8 is typically 100 kilohms, whereas the value of resistor 102a shown in FIG. 10 is typically 2.2 megohms. These resistive values mean that when phototransistors 20, 20c are each on the circuit shown in FIG. 8 will draw twenty times more current from the B+ voltage supply than the circuit shown in FIG. 10. Since the B+ voltage supply is typically a battery for which current drain is desired to be conserved, the circuit shown in FIG. 10 is preferred.

Still a fourth embodiment of the remotely controllable function initiating circuitry in accordance with the present invention is shown in FIG. 12. This circuit again permits differentiation between a constant applied illumination source, such as the ambient light and such additional light as may be intentionally directed at the test initiating phototransistor 20d.

In the embodiment of the function initiating circuitry shown in schematic form in FIG. 12, still another, second, phototransistor 20e is employed. This phototransistor is situated at a physically distinct, displaced location upon the unit 10 (shown in FIG. 3) containing the smoke detector 50 from the location of phototransistor 20d. If, by occurrence of ambient light or by intentional illumination, is placed into conduction, no actuation of either phototransistor 20d or switch 20 will suffice to develop greater than approximately zero volts on electrode 17. Thus, the conduction of phototransistor 20e disables both the manually or remotely initiated test function. Conversely, when the phototransistor 20e is not subject to a high level of illumination, and is accordingly non-conducting, conduction of current from positive voltage supply B+ through resistor 19 may be enabled either through phototransistor 20d or switch 20. This conduction will raise the voltage upon electrodes 17 and 15, and cause smoke detector 50 to alarm.

The enablement of such a current through phototransistor 20d may result from intentional continuous illumination by light source 8, and is not dependent upon any intermittent or pulsed illumination. A common scenario where the embodiment of the circuit shown in FIG. 12 might be actuated to remotely initiate some function, typically a test, is to maintain the phototransistor 20e in darkened ambient light conditions such as a dark room while a directed light beam, such as from a flashlight, is directed to illuminate only phototransistor 20d.

It should be understood from the discussion of all embodiments of the function initiating circuitry in accordance with the present invention that such circuitry is not required to be exclusively used to cause an occurrence, such as the sounding of a smoke alarm, but may also, equivalently, be used to cause suspension or termination of an ongoing occurrence, such as the undesired sounding of the same smoke alarm. Thus the function initiated may be either on enablement or a disablement of another, primary, function. The enablement or disablement may be temporary or, with incorporation of a bistable latch, permanent. Indeed, it may be envisioned that two separate and distinct function-initiating circuits in accordance with the present invention could be incorporated in a single device—one to actuate the device to assume a first, test, mode of operation and the other circuit to actuate the device to reassume a second, operational, mode of operation.

From the foregoing, it will be observed that numerous variations and modifications may be effected without departing from the spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. A unit attachable to a fixed member for executing a selected function and which may be easily tested from a remote location using a transmitter of energy pulses, the unit comprising:

means for executing said selected function;

means responsive to a selected condition for testing the operation of at least a portion of said executing means and for generating an indicium of the result thereof;

means for detecting a predetermined plurality of incident, test initiating energy pulses and means, coupled between said detecting means and said testing means, for providing said selected condition in response to detection of said plurality of pulses and then for as long as said incident test initiating pulses continue to be detected.

2. An easily tested unit as in claim 1 with said executing means including predetermined condition sensing means.

3. An easily tested unit as in claim 1 with said executing means including predetermined control means.

4. An easily tested unit as in claim 1 with said unit including a power source.

5. An easily tested unit as in claim 4 with said power source being substantially self-contained.

6. An easily tested unit as in claim 4 with said power source including a battery.

7. An easily tested unit as in claim 4 with said detecting means including means for sensing selected, remotely generated, radiant energy incident thereon.

8. An easily tested unit as in claim 7 with said sensing means including radiant energy responsive switching means.

9. An easily tested unit as in claim 7 with said sensing means including an incident sonic energy detector.

10. An easily tested unit as in claim 7 with said sensing means including an incident radio frequency energy detector.

11. An easily tested unit as in claim 7 with said sensing means including an incident infrared beam detector.

12. An easily tested unit as in claim 1 with said executing means including indicium generating means for identifying that said function has been executed, and means for sensing a remotely generated, incident signal including means for terminating said generated indicium in response thereto.

13. An easily tested unit as in claim 1 with said executing means including means for detecting smoke.

14. An easily tested unit as in claim 13 including means for providing an alarm indicative of detected smoke.

15. An easily tested unit as in claim 14 including means for detecting a remotely generated, alarm terminating, incident signal and means for terminating said alarm, at least for a predetermined period of time, in response thereto.

16. An easily tested unit as in claim 14 with said detecting means including means for sensing selected radiant energy incident thereon.

17. An easily tested unit as in claim 16 with said selected radiant energy being electro-magnetic energy and with said sensing means including an incident electro-magnetic energy responsive sensor.

18. An easily tested unit as in claim 16 with said selected radiant energy being radio frequency electromagnetic energy and with said sensing means including an incident radio frequency receiving means.

19. An easily tested unit as in claim 1 with said executing means including means for providing illumination in response to a sensed, predefined condition.

20. An easily tested sensor unit comprising:

sensing means for detecting a predetermined condition and for generating an electrical signal responsive thereto;

indication means, responsive to said electrical signal, for providing a detectable alarm identifying said condition;

manually operable means for initiating a test condition of the sensor unit including initiating said detectable alarm in response to the presence of said test condition; and means responsive to a selected number of pulses in a selected incident beam of radiant energy for initiating said test condition in response to detection of said selected incident energy.

21. An easily tested sensor unit as in claim 20 wherein said sensing means includes means for detecting a condition selected from a group including voltage; current; pressure; fluid flow.

22. An easily tested sensor unit as in claim 21 with said indication means including means for generating an audible alarm signal.

23. An easily tested sensor unit as in claim 21 with said incident energy responsive means including photo sensitive means for switching from a first state to a second state in response to an incident beam of electromagnetic radiant energy of a selected frequency.

24. An indicating unit for sensing a predetermined condition and for providing an indicium thereof comprising:

means for sensing the predetermined condition and for generating an electrical signal responsive thereto;

indication means, responsive to said electrical signal, for providing a detectable indicium identifying said condition; and means, responsive to selected, remotely transmitted incident energy, for terminating, at least for a selected period of time, said indicium in response to detection of said selected incident energy.

25. A sensor unit easily tested from a remote location using a transmitter of energy comprising:

sensing means for detecting a predetermined condition and for generating an electrical signal responsive thereto;

indication means, responsive to said electrical signal, for providing a detectable indicium identifying said condition; and receiving means, responsive to selected incident energy from the transmitter, for initiating a selected unit test in response to detection of said selected incident energy and for continuing said test only for so long as said incident energy is detected.

26. An easily tested unit as in claim 25 including:

means for coupling the unit to an adjacent source of electrical energy;

said sensing means including means for detecting an absence of expected electrical energy at the adjacent source with said indication means providing a selected indicium in response to said sensing means detecting said absence of expected electrical energy.

27. An easily tested unit as in claim 26 with said incident energy responsive means including photosensitive switching means for changing from a first condition to a second condition in response to detecting said selected incident energy.

28. A unit remotely mountable with respect to a displaced test initiation area, the unit comprising:

a housing defining an interior region, said housing including means for mounting;

means carried by said housing for executing a preselected function;

radiant energy beam collecting means, carried by said housing, for collecting a signaling beam of energy generated at the test initiation area and directed so as to be incident on an exterior surface of said housing;

means for sensing the presence of said collected signaling beam; and means responsive to said sensing means for initiating a predetermined test of the unit only for as long as the signaling beam is sensed.

29. A unit as in claim 28 with said executing means including means for detecting a predetermined alarm condition with said initiation means including means for testing the operation of said detecting means.

30. A unit as in claim 28 with said collecting means including a radiant energy plastic collecting member.

31. A unit as in claim 28 with said test initiating means adopted to continuously test the unit so long as said collected signaling beam is sensed.

32. A system for easily initiating a secondary function of a remotely located unit having a primary function, the system comprising:

a selected, remotely located unit which includes means for executing a secondary function in response to a seletcted condition and including condition initiating means responsive to the presence of an incident, remotely generated, control beam of radiant energy for generating said selected condition during the duration of said presence; and means, separated from said unit, for generating said control beam of radiant energy such that said beam is directable so as to be incident on at least a portion of said condition initiating means thereby generating said selected condition.

33. An easily tested sensor unit comprising:

a housing;

means carried by said housing means for detecting a selected condition;

means, responsive to said detected condition, for generating a selected alarm indicium;

means, carried by said housing, for detecting an incident radiant energy control beam and for generating an electrical signal responsive thereto; and means, carried by said housing, for executing a test of said detecting means only in response to and for so long as said electrical signal is generated.

34. An easily tested sensor unit as in claim 33 with said detecting means including means for detecting combustion and with said control beam detecting means including infrared sensing means.

35. An easily tested sensor unit as in claim 34 with said infrared sensing means having a first state in response to incident infrared radiant energy in the incident control beam with said electrical signal generated only in response to said first state.

36. An easily silence smoke detector comprising:

means for detecting smoke;

means for generating an alarm signal in response to detected smoke;

means for detecting an incident infrared control beam and for generating an electrical signal responsive thereto; and means for terminating, only for a predetermined period of time, said alarm signal in response to said generated electrical signal.

37. An easily tested detector comprising:

means for detecting smoke;

means for generating an alarm signal in response to detected smoke;

means for detecting an incident infrared control beam and for generating an electrical signal in response (responsive) thereto; and means for testing the detector including said alarm signal in response to detection of said electrical signal and then for the duration thereof.

38. A method of conducting a test of a remotely located electrical unit using a selected command beam generated outside of the unit comprising the steps of:

directing the selected command beam at a region of the unit;

detecting the presence of the incident command beam when it encounters the region;

initiating a test of the unit in response to the detected incident beam;

continuing the test so long as the incident beam is detected; and terminating the test when the incident beam is no longer detected.

39. A unit attachable to a fixed member for executing a selected function and which may be easily tested from a remote location, the unit comprising:

means for executing said selected function;

means responsive to a selected condition for testing the operation of at least a portion of said executing means and for generating an indicium of the result thereof;

means for detecting a remotely generated, incident coded, test initiating signal; and means, coupled between said detecting means and said testing means, for providing said selected condition in response to and for as long as said incident test initiating signal is detected.

40. An easily tested unit as in claim 39 with said executing means including predetermined condition sensing means.

41. An easily tested unit as in claim 39 with said executing means including predetermined control means.

42. An easily tested unit as in claim 39 with said unit including a power source.

43. An easily tested unit as in claim 39 with said power source being substantially self-contained.

44. An easily tested unit as in claim 39 with said power source including a battery.

45. An easily tested unit as in claim 39 with said detecting means including means for sensing selected, remotely generated coded, radiant energy incident thereon.

46. An easily tested unit as in claim 45 with said sensing means including radiant energy responsive switching means.

47. An easily tested sensor unit comprising:

sensing means for detecting a predetermined condition and for generating an electrical signal responsive thereto;

indication means, responsive to said electrical signal, for providing a detectable alarm identifying said condition;

manually operable means for initiating a test condition of the sensor unit including initiating said detectable alarm in response to the presence of said test condition; and means responsive to a selected, incident pulsed beam of radiant energy, for initiating said test condition in response to detection of a predetermined plurality of incident energy pulses.

48. An easily tested sensor unit as in claim 47 wherein said sensing means includes means for detecting a condition selected from a group including voltage; current; pressure; fluid flow.

49. An easily tested sensor unit as in claim 48 with said indication means including means for generating an audible alarm signal.

50. An easily tested sensor unit as in claim 48 with said incident energy responsive means including photo sensitive means for switching from a first state to a second state in response to an incident pulsed beam of electro-magnetic radiant energy of a selected frequency.

51. A unit comprising:

means for detecting a predetermined condition and for generating an electrical signal responsive thereto;

indication means, responsive to said electrical signal, for providing a detectable indicium identifying said condition; and means, responsive to selected incident intermittent energy, for determining, for a selected period of time, said indicium in responsive to detection of said selected incident energy.

* * * * *